Figure 1:
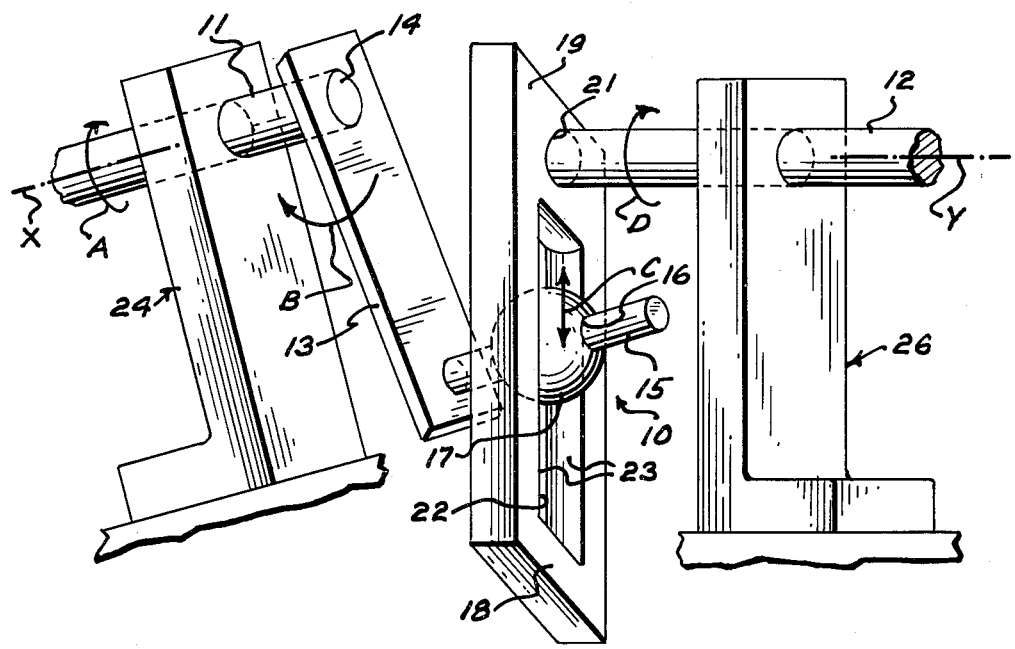

Jan. 14, 1964  D. R. MacFARLANE  3,117,431
UNIVERSAL JOINT
Filed Aug. 9, 1961

INVENTOR
D. R. MAC FARLANE
BY J. L. Landis
ATTORNEY

United States Patent Office 3,117,431
Patented Jan. 14, 1964

---

3,117,431
UNIVERSAL JOINT
Donald R. MacFarlane, Indianapolis, Ind., assignor to Western Electric Company, Incorporated, a corporation of New York
Filed Aug. 9, 1961, Ser. No. 130,400
2 Claims. (Cl. 64—10)

The present invention relates generally to universal joints, and more particularly to the utilization of such joints to couple two shafts having axes which are askew. Accordingly, the general objects of the invention are to provide new and improved apparatus of such character.

Universal couplings are often necessary for the transmission of an applied torque between two shafts which cannot be axially aligned because of the particular application. In many constructions, it is required that any universal coupling utilized allow the two shafts interconnected to conform to available spaces such that the axes of the shafts may be neither coplanar nor intersecting. Although several different types of universal couplings are available commercially for shafts which are not axially aligned, it is necessary in each type presently known that the axes of the shafts to be interconnected either (1) lie in a common plane or (2) intersect.

Therefore, a more specific object of the invention is to provide new and improved universal joints for coupling two shafts to transmit an applied torque therebetween, which do not require that both shafts lie in a common plane or extend along axes that intersect and are therefore applicable in crowded places where the coupling shafts must conform to the available space.

With the foregoing and other objects in mind, a coupling is provided for two shafts having axes which are askew. In accordance with certain aspects of the invention, the coupling includes a first crank arm rigidly mounted on a first shaft and a second crank arm mounted on the second shaft. A ball member is mounted on the first crank arm at a point displaced from the axis of the first shaft and is slidable relative to the first crank arm in a direction generally parallel to that axis. The second crank arm is provided with an elongated, generally radial slot having arcuate side walls to captivate the ball member within the slot so as to permit both universal swiveling movement and linear movement of the ball member therewithin. Thus, rotation of either shaft about its own axis is transmitted through the two crank arms to cause rotation of the other shaft about its axis, the ball member both swiveling and traveling along the slot, and moving relative to the first crank arm, as required, to accomplish the coupling of the two shafts for the transmission of an applied torque therebetween.

Figure 2:
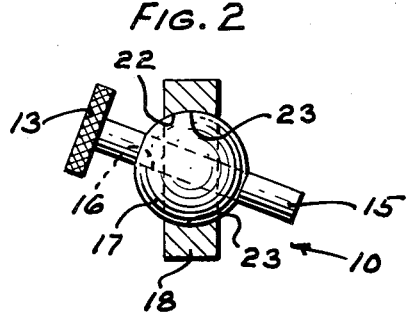

Other objects, advantages, and aspects of the invention will appear from the following detailed description of a specific embodiment thereof, when taken in conjunction with the appended drawings, in which:

FIG. 1 is a perspective view of a universal joint in accordance with the invention, as utilized for coupling two shafts having axes which are noncoplanar and nonintersecting; and FIG. 2 is a sectional view through the joint, illustrating further details of a ball member and a slotted bar member which, together, constitute the joint.

Referring now in detail to the drawings and particularly to FIG. 1, there is illustrated a universal joint 10 in accordance with one specific embodiment of the invention, which is designed to couple two shafts 11 and 12 for the transmission of an applied torque therebetween. While either of the shafts 11 or 12 may be the driving shaft in a particular application, it will be assumed for the purposes of the present description that the shaft 11 is the driving shaft and rotates continuously in a clockwise direction (arrow A) about an axis X.

The shaft 11 is provided with a crank 13 secured to the free end 14 thereof so that the shaft 11 rotates the crank 13 in a clockwise direction (arrow B) about the axis X. The crank 13 is provided with a crank pin 15 secured to the other end thereof, which is slidably received within a diametrical bore 16 extending through a spherical ball 17 so that the shaft 11 and crank 13 operate to rotate the ball 17 about the axis X of the shaft 11.

A bar 18 is secured at one end 19 to the driven shaft 12 at an end 21 thereof, and is provided with an elongated slot 22 therethrough, the longitudinal axis of which is perpendicular to the axis Y of the shaft 12. Opposed surfaces 23—23, forming the side walls of the slot 22, are of matching arcuate configuration (as best seen in FIG. 2) to define a socket which captivates the ball 16 for both universal swivelling movement, as in any ball-and-socket joint, and for linear sliding movement (arrow C) along the length of the slot 22. As the ball 17 is rotated about the axis X by the crank 13, it causes rotation of the bar 18, and thus the driven shaft 12 (arrow D) about its own axis Y. During each revolution of the shaft 11, the ball 17 both swivels in and travels along the slot 22 and slides along the crank pin 15, as required, to permit a single revolution of the shaft 12.

Thus, the two shafts 11 and 12 are interconnected by the coupling 10 for the transmission of an applied torque therebetween even though their axes X and Y do not intersect and do not lie in a common plane. Conversely assuming that the shaft 12 is the driving shaft, the bar 18 is rotated therewith about the axis Y and thereby compels the rotation of the ball 17, crank 13, and shaft 11 about the axis X. The shafts 11 and 12 are respectively mounted in bushings 24 and 26 for rotation about the axes X and Y, which are fixed.

One specific application of the invention is in applying bending torque to flat, closely spaced contact springs used in telephone dials. In this application, the ends of the springs are threaded in closely spaced parallel relationship through elongated slots at the bottom of a pair of closely spaced shafts which must be turned independently from above through variable small angles to adjust the springs. Because of the close proximity and parallelism of the two shafts, and because of other compactness requirements of the equipment, conventional drives cannot be used. However, two couplings in accordance with the present invention, mounted next to each other, solve this drive problem in that the motors may be mounted at angles side by side with the drive shaft of each projecting at an angle toward an associated one of the two adjusting shafts.

While the bar member 18 is secured to the shaft 12 in the preferred embodiment of the invention illustrated in the drawings, it is efficient for some applications to mount the bar member 18 on the shaft 12 by a conventional clevis and a pivot-pin linkage so that the bar 18 turns with the shaft 12 but may also pivot relative thereto. In this construction, the ball member 17 may either be fixed to the crank pin 15 or may be limited in its linear movement therealong to prevent disengagement. Similarly, the crank 13 may be pivotably pinned to the shaft 11.

While one specific embodiment of the invention has been described in detail hereinabove, it will be obvious that various modifications may be made from the specific details described without departing from the spirit and scope of the invention.

What is claimed is:
1. A coupling for two shafts having axes which are askew, which comprises a first crank arm rigidly mounted on a first one of the shafts for rotation therewith, a ball member mounted on said first crank arm at a point displaced from the axis of the first shaft, said ball member being slidable relative to said crank arm in a direction generally parallel to the axis of the first shaft, and a second crank arm mounted on the second shaft for rotation therewith, said second crank arm having an elongated slot the longitudinal axis of which is perpendicular to the axis of the second shaft, the slot being provided with arcuate side walls designed for captivating said ball member in the slot so as to permit both universal swivelling movement of said ball member in the slot and linear movement of said ball member along the length of the slot; whereby the rotation of either shaft about its own axis is transmitted through said crank arms and ball member to drive the other shaft, said ball member both swivelling in and travelling along the slot and moving relative to said first crank arm, as required, to accomplish the coupling of the two shafts for the transmission of an applied torque therebetween.

2. A coupling as recited in claim 1, wherein the first crank arm includes a cylindrical crank pin secured to the end of the crank remote from the first shaft, wherein the ball member is provided with a diametrical bore in which the crank pin is slidably received and projects therethrough, and wherein the slot in the second crank arm extends therethrough so as to permit projection of the ball member and crank pin on both sides of the second crank arm.

References Cited in the file of this patent

UNITED STATES PATENTS 901,080     Dock _____ Oct. 13, 1908

FOREIGN PATENTS 722,181     Germany _____ July 3, 1942